US008662714B1

(12) United States Patent
Miller et al.

(10) Patent No.: US 8,662,714 B1
(45) Date of Patent: Mar. 4, 2014

(54) U-TURN LENS FOR A RECESSED LIGHT FIXTURE

(76) Inventors: Jack V. Miller, Seaford, DE (US); Ruth E. Miller, Seaford, DE (US)

( * ) Notice: Subject to any disclaimer, the term of this patent is extended or adjusted under 35 U.S.C. 154(b) by 0 days.

(21) Appl. No.: 13/158,576

(22) Filed: Jun. 13, 2011

(51) Int. Cl.
*F21V 5/00* (2006.01)
*F21V 3/00* (2006.01)
*F21V 5/04* (2006.01)
*F21S 8/00* (2006.01)
*F21V 9/00* (2006.01)

(52) U.S. Cl.
USPC ...... 362/327; 362/311.06; 362/335; 362/148; 362/293

(58) Field of Classification Search
USPC ............ 362/364, 311.06, 327, 340, 335, 147, 362/148, 365, 293
See application file for complete search history.

(56) References Cited

U.S. PATENT DOCUMENTS

| 3,580,679 | A | * | 5/1971 | Perkin | 356/407 |
| 5,303,125 | A | * | 4/1994 | Miller | 362/554 |
| 6,168,294 | B1 | * | 1/2001 | Erni et al. | 362/298 |
| 6,719,442 | B1 | * | 4/2004 | Chen | 362/328 |
| 7,153,002 | B2 | * | 12/2006 | Kim et al. | 362/327 |
| 7,223,002 | B2 | * | 5/2007 | Miller et al. | 362/551 |
| 7,275,849 | B2 | * | 10/2007 | Chinniah et al. | 362/555 |
| 7,384,167 | B1 | * | 6/2008 | Gamache et al. | 362/147 |
| 7,661,852 | B2 | * | 2/2010 | Yu | 362/362 |
| 2002/0076151 | A1 | * | 6/2002 | Kinard et al. | 385/33 |
| 2006/0018125 | A1 | * | 1/2006 | Miller et al. | 362/554 |
| 2006/0028834 | A1 | * | 2/2006 | Miller et al. | 362/551 |
| 2008/0137345 | A1 | * | 6/2008 | Wimberly | 362/299 |
| 2009/0226133 | A1 | * | 9/2009 | Jewell et al. | 385/33 |
| 2009/0310915 | A1 | * | 12/2009 | Jewell et al. | 385/33 |

FOREIGN PATENT DOCUMENTS

EP        621442 A1 * 10/1994 ............. F21V 17/00

* cited by examiner

*Primary Examiner* — Jong-Suk (James) Lee
*Assistant Examiner* — Bryon T Gyllstrom

(57) ABSTRACT

A U-turn lens for a recessed light fixture comprising a tubular, transparent, internally reflective, hollow cylindrical lens having a closed top including a hot mirror receiving focused light from a reflector lamp, an inside diameter extending to an open lower end where focused light is emitted and collimated light is received through the lens outside the inside diameter to an angular reflector reflecting the collimated light transversely to illuminate a concave decorative shade.

15 Claims, 3 Drawing Sheets

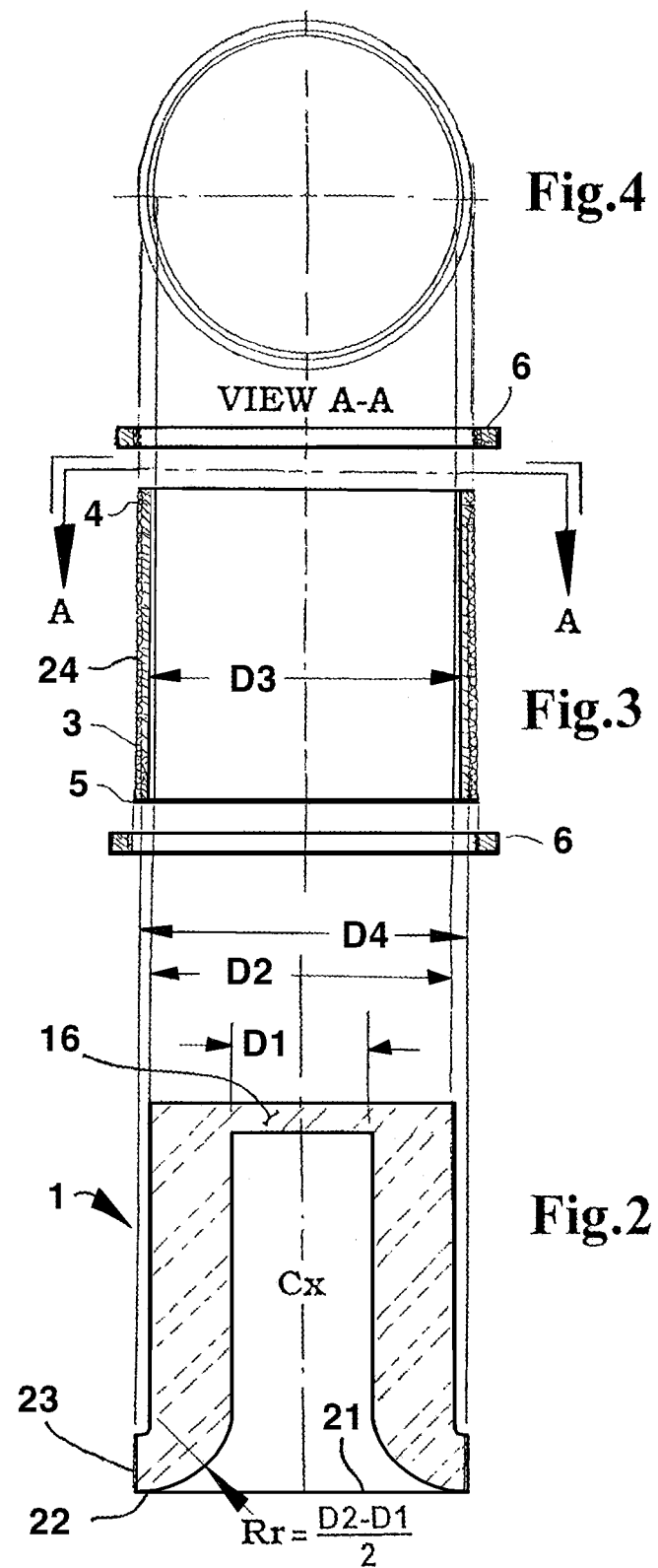

U-TURN LENS FOR A RECESSED LIGHT FIXTURE

FIELD OF THE INVENTION

The present invention relates to the field of light fixtures and more specifically to recessed, ceiling-mounted light fixtures that emit tungsten/halogen lamp light downward, into a room, and also upward to illuminate a concave, decorative shade.

BACKGROUND OF THE INVENTION

Small, narrow-beam tungsten/halogen reflector lamps, such as the popular MR-16 (Miniature Reflector, 16 8ths of an inch, [2 inches] in diameter) produce a narrow 10° beam of light with an intense center spot. Actually, all lamp manufacturers define the published beam diameter as the diameter at which the intensity is ½ the center intensity. This half-power diameter is usually at about 30% of the full beam diameter, and contains about 70% of the lamp energy. In order to keep the beam angle narrow, lamp manufacturers design a "hybrid" reflector that produces a peak center intensity at a focal point, surrounded by a parabolic collimated ring around the center peak.

It is also know that tungsten/halogen lamps produce about 10% visible light and about 90% IR (Infra Red heat). That IR is radiated HVAC (air conditioning) energy must be used to pump IR heat out of the room in a cooling mode. Prior art methods for lighting a room using a decorative shade are crude and ineffective. For instance, a light bulb is usually positioned in the shade, below the ceiling. If an "A-type" lamp is used, it will brightly light the shade, but cannot project a downward beam. Thus 100% of the lamp energy is emitted into the room. If a reflector lamp is used to project a beam into the room, it can't also illuminate the shade . . . and again, all the lamp heat is in the room.

PURPOSE OF THE PRESENT INVENTION

The purpose of the present invention is to provide an effective and economical lens for a light fixture that will project a narrow central beam into the room, simultaneously illuminating a decorative lamp shade, and to do so without emitting IR heat into the room below. This is accomplished with a unique optical system including a complex lens. The inventor, as his own lexicographer, describes this lens as a "U-turn" lens, a clear description of a lens that turns down-light into up-light.

BRIEF DESCRIPTION OF THE DRAWINGS

FIG. 2 is a longitudinal cross-section of the U-turn lens of FIG. 1;

FIG. 3 is a longitudinal cross-sectional view of the lens bezel of FIG. 1 and the bezel retaining rings; and FIG. 4 is a transverse plan view of the lens bezel of FIG. 3.

DETAILED DESCRIPTION OF THE DRAWINGS

Figure 1:
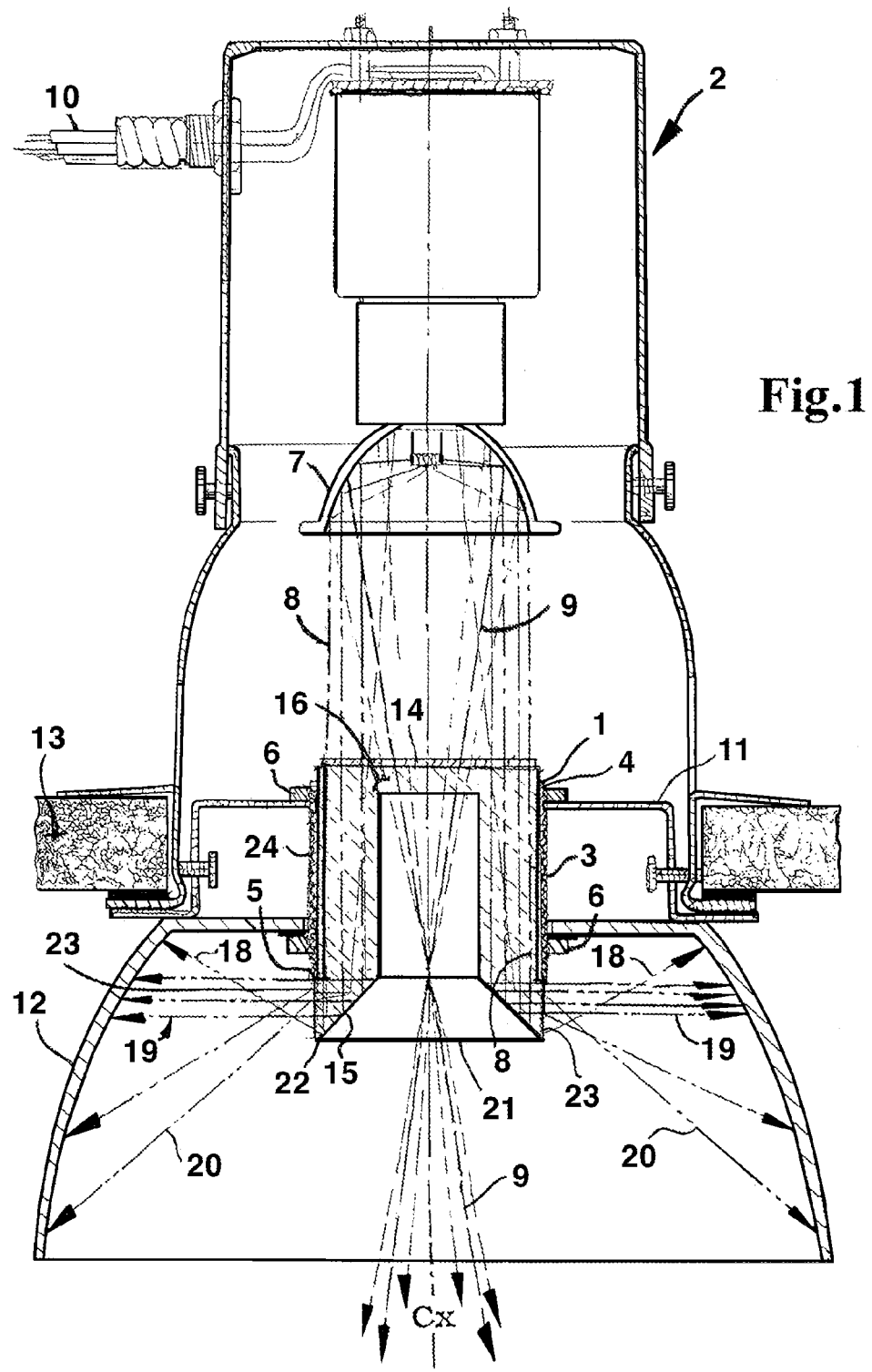
FIG. 1 is a cross-sectional view of a recessed light fixture including a U-turn lens and bezel according to the present invention.

In FIG. 1 a U-turn lens (1) for a recessed downlight fixture (2) includes: a tubular, cylindrical lens bezel (3) having an upper end (4) extending into said light fixture, and a lower end (5) extending downward from said light fixture, said bezel having an optical axis (Cx) therethrough. A tubular, cylindrical, U-turn lens (1) is held within said bezel, said lens having internally-reflective surfaces due to the index of refraction difference between the lens material (preferably PMMA [polymethyl methacrylate]) and air. Thus the outside lens diameter fitted within said bezel has an internally-reflective inside diameter extending to an open lower end (21); and an outward-extending flange (22) extending radially from said angular, internally-reflective surface (15).

In operation, focused light rays (9) from lamp (7) enter a visible-light-transmitting, IR-reflecting "hot Mirror" (14) at the upper end lens window (16) whereby said hot mirror (14) reflects IR lamp heat back to the lamp, raising the filament temperature and increasing lamp efficiency, while transmitting visible light without IR through the lens window (16) and into the room. Then the collimated peripheral light rays (8) are transmitted downward through the same IR-reflecting, visible-light-transmitting hot mirror (14) and travel downward through PMMA lens tube to the angular light-reflecting surface (15) of the outward-extending flange (22), whereat said light is then emitted transversely from the edge (23) of the flange (22). The outer edge (23) of flange (22) is textured to diffuse transverse rays (19) into conical rays (20) and U-turn rays (18). Thus a decorative shade (12) may be illuminated or trans-illuminated without affecting the focused light beam. An important feature of the invention is that the flange extends radially outward only to the root diameter of the threads on the exterior of the bezel. This allows the lower bezel retaining ring (6) to be removed to permit removal the bezel holder (11) for re-lamping.

In FIG. 2 a longitudinal cross-section view of U-turn lens (1) is shown having a top-end window (16) and an open-end bottom (21) terminating in a horizontal flange (22) having diameter (D4) and light-diffusing textured edge (23). A tubular portion of lens (1) has an inside diameter (D1) and an outside diameter (D2), with a wall thickness of D2-D1 divided by 2, which is also the length of radius (Rr).

In FIG. 3 the lens outer diameter (D2) fits within the inside diameter (D3) of the bezel (3), which has a length extending from the top end (4) to the bottom end (5), and has a threaded exterior engaging threaded rings (6) that secure the bezel in a removable bezel holder (11) as seen in FIG. 1. The outside diameter D4 of flange 22 in FIG. 2 extends outward radially only to the root diameter of the external threads of bezel (3), whereby the lower retaining ring 6 can be removed past the flange diameter (4) of the lens (1), permitting the removal of the shade (12) and the removable bezel holder (11) for re-lamping.

In FIG. 4 a plan view of the bezel of FIG. 3 is shown having a circular shape.

Figure 5:
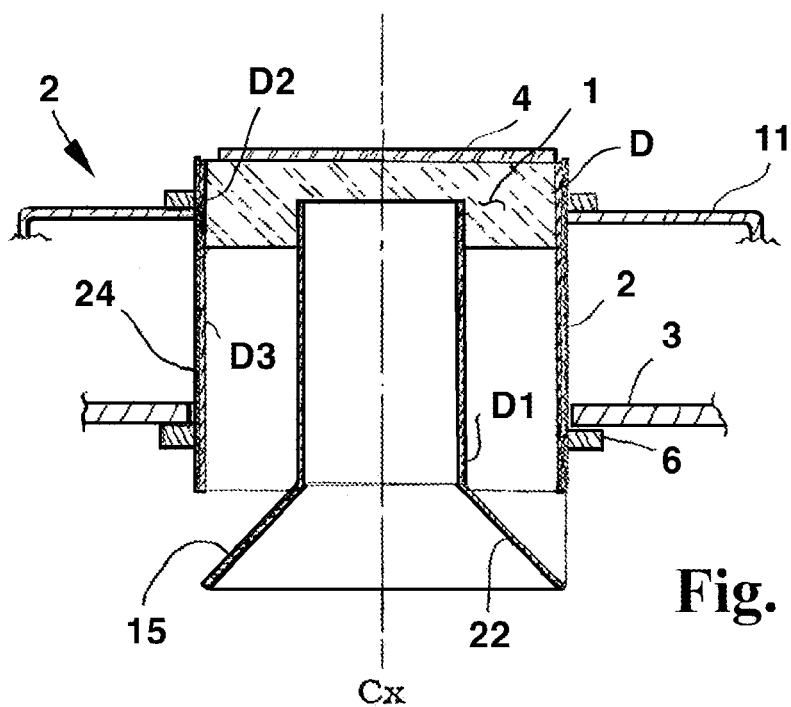
FIG. 5 is an optional structure of the longitudinal cross-section of the U-turn lens shown in FIG. 1 which will produce the same light rays.

In FIG. 5 an optional view of the longitudinal cross-section of the U-turn lens of FIG. 2 is shown in which the reflective surfaces of diameter (D1, D2 and D3) and angular reflector portion (15) is metallic.

SUMMARY OF THE INVENTION

The present invention teaches a U-turn lens for a recessed, ceiling-mounted light fixture that emits a tungsten/halogen lamp to project a narrow beam of light downward into a room, and also emit light transversely, and upward to illuminate a concave, decorative lamp shade.

LIST OF ELEMENTS

U-Turn Lens

1. U-turn lens
2. recessed downlight fixture
3. cylindrical lens bezel
4. lens bezel upper end
5. lens bezel lower end
6. bezel retaining ring
7. hybrid ellipsoidal PAR lamp
8. collimated peripheral light rays
9. focused central light rays
10. remote source of power
11. removable bezel holder
12. decorative shade
13. ceiling
14. dichroic hot mirror
15. angular reflector
16. lens central window
17. not used
18. U-turn rays
19. transverse rays
20. conical rays
21. lens open end
22. flange
23. textured flange edge
24. bezel outside diameter threads

The invention claimed is:

1. A U-turn lens for a recessed light fixture including:
a cylindrical lens bezel having a central longitudinal axis, an upper end extending along one end of the central longitudinal axis, a lower end extending along the opposite end of the central longitudinal axis, an inside diameter and an outside diameter; a tubular, transparent, cylindrical lens disposed within said bezel and oriented along the central longitudinal axis of said bezel, said lens having an internally-reflective outside diameter fitting substantially against the inside diameter of said bezel and comprising an input end corresponding with the upper end of the cylindrical lens bezel and an output end corresponding with the lower end of the cylindrical lens bezel, said cylindrical lens further comprising a substantially flat input surface at the input end and a substantially cylindrical opening in the center of the cylindrical lens extending inwards from the output end of said cylindrical lens said opening being defined by the at least one internally reflective surface and having an identical central longitudinal axis to the cylindrical bezel, said cylindrical lens further comprising an outward extending a flange extending from the cylindrical lens on the output end of the at least one internally reflective surface, said flange extending outwards and obliquely from said inner diameter towards said outside diameter, said lens extending beyond the lower end of the bezel, and receiving generally aimed light from the input end and emitting reflected light, said reflected light being emitted in a direction substantially perpendicular to the central longitudinal axis, said cylindrical lens further comprising an output face for transmitting said reflecting light in a direction substantially perpendicular to the central longitudinal axis.

2. A U-turn lens according to claim 1 in which said cylindrical lens is further comprising an infrared reflecting hot mirror on the input surface, said infrared reflecting hot mirror reflecting heat away from said cylindrical lens and transmitting visible light through the input surface.

3. The U-turn lens according to claim 1 in which said angular light reflecting surface includes an internally reflective surface or coating.

4. The U-turn lens according to claim 1 in which said outside diameter of said bezel has external threads receiving mounting rings.

5. The U-turn lens according to claim 1 in which said output face includes a light-diffusing pattern diffusing a portion of said reflected light.

6. A light fixture, comprising of a U-turn lens of claim 1 and further comprising a light-emitting element.

7. A U-turn lens for a recessed light fixture, oriented with its beam generally pointed down at nadir, including: a tubular bezel having a central longitudinal axis, an upper end extending along one end of the central longitudinal axis, a lower end extending along the opposite end of the central axis, an inside diameter and an outside diameter, with the axis generally oriented on nadir, a transparent, cylindrical or tubular lens disposed within said bezel and oriented along the central longitudinal axis of said bezel, with said lens extending beyond the lower end of the bezel, whereby the lower end of the tubular lens protrudes slightly or more past the bottom plane of the light fixture and the lower end of the bezel, said lens having an internally-reflective outside diameter fitting substantially against the inside diameter of said bezel and comprising an internally-reflective inside diameter extending to an open lower end; and an outward-extending flange extending radially from said lens lower end inside diameter at an intersecting, angular, internally-reflective surface, said flange extending radially outward to the root diameter of the bezel outside diameter; whereby the lamp has at least part of the tubular lens mounted below it approximately on its optical centerline (nadir) with a proportion of the beams entering a top end of the lens, and passing through at least one of a generally flat material and a hole in the lens, to aim are transmitted downwards along the optical axis as a primary beam; and a proportion of light beams entering a top end are transmitted by at least one of the transverse, radial reflector portion, and the outward extending flange; emitted as a secondary beam back towards the light fixture, or at an angle perpendicular, and for this secondary beam to be fanned 360° across a plane parallel to the input surface of the lens.

8. The U-turn lens according to claim 7 in which said angular light reflecting surface includes an internally reflective surface or coating.

9. The U-turn lens according to claim 7 in which said outside diameter of said bezel has external threads receiving threaded mounting rings.

10. The U-turn lens according to claim 7 in which said flange output face includes a light-diffusing pattern diffusing a portion of said reflected light.

11. A light fixture, comprising of a U-turn lens of claim 7 and further comprising a light-emitting element.

12. A transparent, cylindrical lens disposed within a light fixture and oriented along the central longitudinal axis of said light fixture at approximately nadir, said lens having an internally-reflective outside diameter fitting comprising an input end corresponding with the upper end of the cylindrical lens and an output end corresponding with the lower end of the cylindrical lens, said cylindrical lens further comprising a substantially flat input surface at the input end and a substantially cylindrical opening in the center of the cylindrical lens extending from the output end of said cylindrical lens, or a hole throughout the lens like a tubular construction, said opening being defined by the at least one internally reflective surface; said cylindrical lens further comprising a flange extending from the cylindrical lens on the output end of the at least one internally reflective surface, said flange extending outwards and obliquely from said inner diameter towards said outside diameter, said lens extending beyond the lower end of the light fixture, and receiving generally aimed light from the input end and emitting reflected light, said reflected light being emitted in a direction substantially perpendicular to the central longitudinal axis, said cylindrical lens further comprising an output face for transmitting said reflecting light in a direction substantially perpendicular to the central longitudinal axis, whereby a proportion of the beams entering a top end of the lens aim down towards the room as a primary beam; and a proportion of light in the beams entering a top end is transmitted by at least one of the radial reflector portion of the lens, and the outward extending flange, and further aimed back towards the opening where the lens is mounted or at an angle perpendicular, and for this secondary beam to be fanned 360° across a plane parallel to the input surface of the lens.

13. The U-turn lens according to claim 10 in which said angular light reflecting surface includes an internally reflective surface or coating.

14. The U-turn lens according to claim 10 in which said outside diameter of the lens has external threads receiving mounting rings.

15. The U-turn lens according to claim 10 in which said flange output face includes a light-diffusing pattern diffusing a portion of said reflected light.

\* \* \* \* \*